United States Patent
Kaminsky et al.

(10) Patent No.: US 6,848,795 B2
(45) Date of Patent: Feb. 1, 2005

(54) INCREASED CONTRAST OVERHEAD PROJECTION FILMS

(75) Inventors: Cheryl J. Kaminsky, Rochester, NY (US); Robert P. Bourdelais, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/279,599

(22) Filed: Oct. 24, 2002

(65) Prior Publication Data

US 2004/0080725 A1 Apr. 29, 2004

(51) Int. Cl.⁷ ............... G03B 21/00; G03B 21/14; G03B 21/56; G03B 21/60; B23B 7/02
(52) U.S. Cl. ............... 353/120; 353/31; 353/38; 359/443; 359/459; 428/213
(58) Field of Search ............... 353/120–121, 353/31, 38; 359/443, 448, 452, 454, 455, 459; 428/213, 315.5

(56) References Cited

U.S. PATENT DOCUMENTS

| | | | |
|---|---|---|---|
| 3,154,461 A | * 10/1964 | Johnson | 428/159 |
| 4,497,860 A | 2/1985 | Brady, Jr. | 428/156 |
| 4,994,312 A | * 2/1991 | Maier et al. | 428/36.5 |
| 6,166,855 A | * 12/2000 | Ikeyama et al. | 359/580 |
| 6,183,090 B1 | * 2/2001 | Nakanishi et al. | 353/20 |
| 6,346,311 B1 | * 2/2002 | Yeo et al. | 428/143 |
| 6,386,699 B1 | 5/2002 | Ylitalo et al. | 347/105 |
| 2003/0068470 A1 | * 4/2003 | Bourdelais et al. | 428/156 |
| 2003/0118807 A1 | * 6/2003 | Laney et al. | 428/315.5 |
| 2003/0170442 A1 | * 9/2003 | Kaminsky et al. | 428/315.5 |
| 2003/0214717 A1 | * 11/2003 | Kaminsky et al. | 359/599 |
| 2003/0214812 A1 | * 11/2003 | Bourdelais et al. | 362/330 |
| 2004/0121257 A1 | * 6/2004 | Kaminsky et al. | 430/201 |

OTHER PUBLICATIONS

R. P. Bourdelais, et al, "Light Diffuser with Variable Diffusion", U.S. Appl. No. 10/147,703, (D–83948) filed May 16, 2002.

C. J. Kaminsky, et al., "Light Diffuser with Colored Variable Diffusion", U.S. Appl. No. 10/147,659, (D–84407) filed May 16, 2002.

C. J. Kaminsky, et al., "Reflection Media for Scannable Information System", U.S. Appl. No. 10/279,584, (D–84929) filed Oct. 24, 2002.

R. P. Bourdelais, et al., "Light Management Film with Colorant Receiving Layer", U.S. Appl. No. 10/279,557, (D–84987) filed Oct. 24, 2002.

* cited by examiner

*Primary Examiner*—Judy Nguyen
*Assistant Examiner*—Magda Cruz
(74) *Attorney, Agent, or Firm*—Arthur E. Kluegel

(57) ABSTRACT

Disclosed is a projection media comprising a transparent polymer layer with random light diffusing elements and having a Tg of less than 75° C.

25 Claims, 8 Drawing Sheets

INCREASED CONTRAST OVERHEAD PROJECTION FILMS

CROSS REFERENCE TO RELATED APPLICATIONS

This application is one of a group of three applications co-filed under Ser. Nos. 10/279,599, 10/279,584, and 10/279,557 the contents of which are incorporated herein by reference.

FIELD OF THE INVENTION

The invention relates to a projection media. In a preferred form, the invention relates to a projection media for use in an overhead projection system.

BACKGROUND OF THE INVENTION

Current overhead projection media typically consists of a transparent film with printing of some color and density. The projection film is placed on a light source where light is transmitted through the projection film and collected by the collection lens. The collection lens then projects the light to a projection screen. The projected image is much larger than the original projection film, making this system suitable for multiple viewers, as in a conference room or a classroom.

Unfortunately, the current projection film has some drawbacks. Typically, the projected image will be black or colored features set against a brightly illuminated white background of transmitted light, for example, black text (essentially no light transmission) on a background of maximum light projection.

Because the bright white background of the projected image is bright, the viewers can not easily view light colors printed on the transparency. In addition to the light coming from the overhead projector and comprising the image information, ambient light will be incident on the projection screen and reflected by this screen towards the audience. To obtain an image on the projection screen that is sufficiently rich in contrast during a presentation, at which illustrations, graphs and the like are shown by means of an overhead projector, the audience space will have to be darkened considerably. This darkening, which is often necessary more than once during a lecture, is a disturbing and detracting operation. Moreover, the darkening reduces the quantity of light for the audience. This may be troublesome if they want to make notes, for example. Moreover, the audience is less well visible to the speaker, due to the darker ambience. Until now, the darker ambience has been accepted as a necessity and no useful overhead presentation system has been conceived which can work with a satisfactory contrast without darkening. An increase of the power of the lamp in the illumination system, so that the signal light will be considerably more intensive than the ambient light, is not a good solution because the lamp must then be cooled thoroughly, which necessitates the use of a fan causing a disturbing noise, which is troublesome, particularly during lectures.

It would be advantageous to have a transparency film that could be projected with bright and dark areas with colors.

Light diffusing elements that scatter or diffuse light generally function in one of two ways: (a) as a surface light diffusing element utilizing surface roughness to refract or scatter light in a number of directions; or (b) as a bulk light diffusing element flat outer surfaces and embedded light-scattering elements. The surface light diffusing elements normally utilize the rough surface, typically with a lens, exposed to air, affording the largest possible difference in index of refraction between the material of the diffuser and the surrounding medium and, consequently, the largest angular spread for incident light. The bulk diffuser diffuses the light within the film. Examples are small particles, spheres, or air voids of a particular refractive index are embedded another material with a differing refractive index.

Diffusion is achieved by light scattering as it passes though materials with varying indexes of refraction. This scattering produces a diffusing medium for light energy. There is an inverse relationship between transmittance of light and diffusion and the optimum combination of these two parameters is desired for each application.

U.S. Pat. No. 5,852,514 (Toshima et al.) describes a light diffusing element comprising a light diffusion layer including acrylic resin and spherical particles of polymethyl methacrylate on a transparent support. Whereas this film would diffuse the light efficiently, the polymers used have high glass transmission temperatures and would therefore be difficult to melt the spherical particles completely to create areas of specular transmission. When projected these not completely melted lenses would diffuse a portion of the light lowering the brightness of the printed, more specular, projected areas and thus lowering contrast of the overhead projected image.

In U.S. Pat. No. 6,177,153, oriented polymer film containing pores for expanding the viewing angle of light in a liquid crystal device is disclosed. The pores in U.S. Pat. No. 6,177,153 are created by stress fracturing solvent cast polymers during a secondary orientation. In example 1 of this patent, the reported 90% transmission includes wavelengths between 400 and 1500 nm integrating the visible and invisible wavelengths, but the transmission at 500 nm is less that 30% of the incident light. Such transmission values would cause unacceptably dark images when projected onto a projection screen.

U.S. Pat. No. 3,763,779 (Plovan) discloses a method for copying an image by selectively coalescencing microporous voids in a voided film to create areas of transparency. The method has limitations in that to produce a copy in the voided film, an original must be used and the original must be of a particular material and format. It would be desirable to have a process to selectively coalesce voids using an electronic file as the template. The film has voids throughout the thickness of the film so that to make an area of the film transparent, the voids throughout the thickness of the film must all be coalesced or melted. This requires a substantial amount of energy making this method expensive, time consuming, and difficult.

U.S. Pat. No. 6,386,699 (Ylitalo et al.) discloses an embossed media for use as an inkjet receiver. This receiver could be part of a transparency media for overhead projection. The embossed surface is used to catch the inkjet materials and allow for drying time. The inkjet process does not change the structure of the embossed surface of the receiver media and would therefore the projected image as all the same light intensity on the screen when lit by the overhead projection system.

U.S. Pat. No. 4,497,860 (Brady) discloses a method of using a linear prism array to project areas onto an overhead projection screen of high and low illumination. The method involves using a sheet with a linear prism on one side and heat to create non-refracting areas that show up as bright areas when projected. The light that passes through the still intact linear prism array is deflected away from the collection lens and is viewed as darker areas of illumination on the screen. By adding a diffraction grating and another linear prism array, the method can create colored images where the projected image can have at most two colors (one non-refracting area color and one refracting area color), for example, purple text on a green background. It would be desirable if more than two colors could be displayed by the overhead projection system at once. An undesirable aspect is the process of molding of the linear prism array must be very exact leading the method to become cost prohibitive. A small difference in molding temperature or time yields vastly different qualities of projection media. In addition, when the linear prisms are melted, if the melting tool is not correctly aligned with the linear prism array, then some of the prisms will be melted partially distorting the projected image in color and density because the half-melted lens array will not deflect light correctly. A moiré pattern may be visible when the films are projected because of the use of a repeating surface pattern, especially when the one linear prism array is placed in conjunction with another linear prism array or diffraction grating. This moiré pattern is undesirable as it detracts from the projected material.

U.S. Pat. No. 5,369,419 (Stephenson et al.) describes a thermal printing system where the amount of gloss on a media can be altered. The method uses heat to change the surface properties of gelatin, which has many disadvantages. Gelatin cannot achieve high roughness averages, thereby having a low distinction between the matte and glossy areas of the media. This small distinction between the matte and glossy states leads to a low signal to noise ratio and when projected, creates lower contrast ratios. Gelatin also is very delicate, scratch prone, and self-healing, and so it tends to flow over time thus changing its surface roughness and other properties with time especially in high humidity and heat, and is dissolved if placed in water. Also, gelatin has a native yellow color, is expensive, and is tacky, sticking to other sheets and itself. It would be desirable to use a material that had no coloration, is more stable in environmental conditions, and could have a higher surface roughness.

U.S. Pat. No. 2,739,909 relates to a heat-sensitive recording paper created by overcoating black-colored paper with a continuous thermoplastic resin material containing microscopic voids dispersed throughout the resin. The coating layer is opaque, but becomes transparent by the localized action of a stylus using either heat or pressure or both to disclose the black color of the support. There is a problem with this element in that the manner of obtaining the voids is complicated which involves carefully controlled drying conditions of emulsions. Another disadvantage with this design is that while the coating turns transparent, the coating is formed on a black colored paper that makes the invention useless for a projection application.

PROBLEM TO BE SOLVED BY THE INVENTION

There remains a need for an improved projection film to provide increased contrast between printed and non-printed areas of displayed images as well as color.

SUMMARY OF THE INVENTION

The invention provides a projection media comprising a transparent polymer layer with random light diffusing elements and having a Tg of less than 75° C.

ADVANTAGEOUS EFFECT OF THE INVENTION

The invention provides improved projection media to display areas of brightness and darkness for increased contrast as well as color.

DETAILED DESCRIPTION OF THE INVENTION

Figure 1:
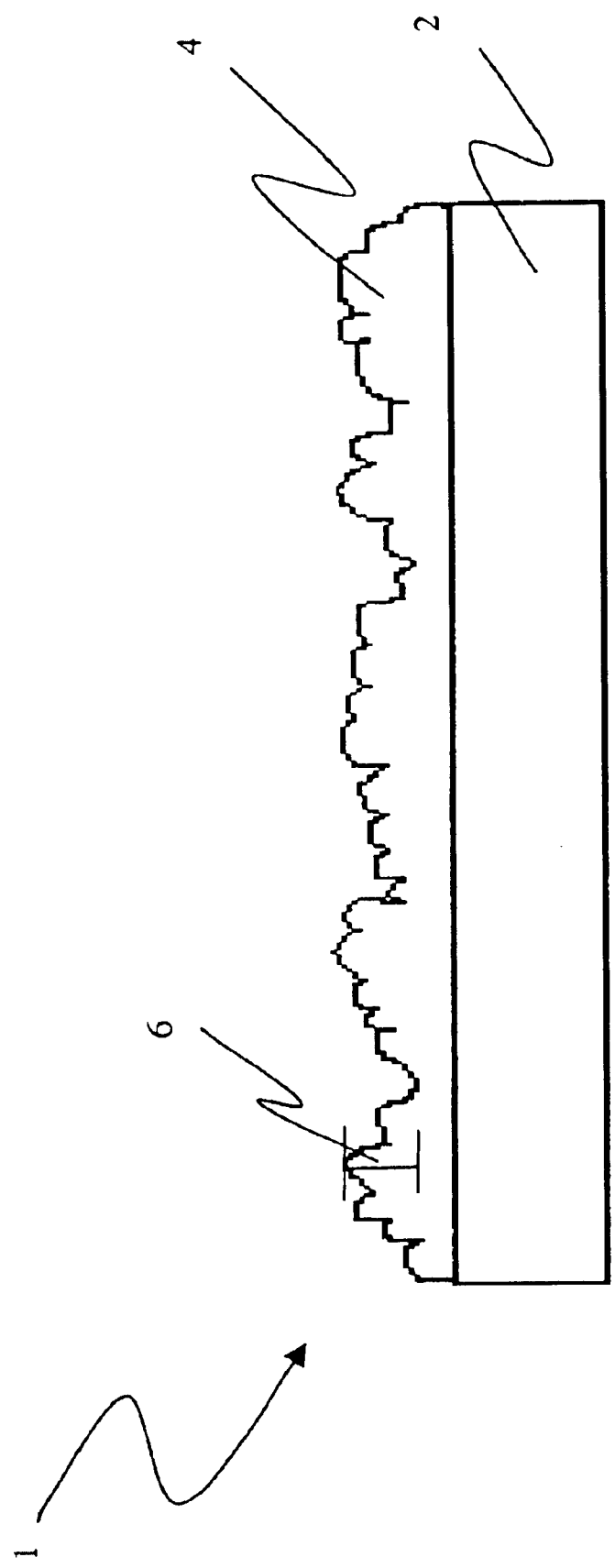
FIG. 1 illustrates a cross section of a projection media with complex lenses suitable for use in an overhead projection system.

The invention has numerous advantages over prior practices in the art. Using light diffusing elements that are flattened with exposure to heat and/or pressure, a high contrast projected image can be obtained where the printed areas (flattened light diffusing elements) are bright and the non-imaged areas are dark. This increased contrast between the printed and non-printed areas allows the overhead projected image to be easily viewed without having to dim the ambient lighting. Not only can the imaged areas be bright, but they can also be colored producing projected images of text, images, shapes, and pictures with many colors on a darkened background. Furthermore, lighter colors that were unable to be projected before such as yellow, pink, and light blue because they were projected against a brightly illuminated white background, can now be displayed because the background un-printed areas are dark gray.

The process for projecting a printed projection media with areas of specular and diffuse transmission comprises having a light source that transmits light through the projection media. The light transmitted through the projection media in the specular areas will be collected by a collection lens and will be projected to the projection screen as a bright area. A percentage of the light that passes through the un-printed areas (diffuse areas) will be deflected from the collection lenses and appear as a darker area on the projection screen. How dark the area appears is related to how much light is diffused by the diffusing elements. If the diffusing elements do not diffuse the light much, the collection lenses will collect more light and the projected area would not be as dark as a projection media with high diffusion light diffusing elements would.

Furthermore, with the correct choice of polymers and substrates, the projection media of the invention can be printed using standard thermal printing systems available today. This enables a new form of projection media that can be easily plugged into standard overhead printing and displaying systems.

The diffusing elements are randomly placed to avoid undesirable optical interference patterns that could be distracting to the viewer such as a moiré pattern. The diffusion film of the present invention can be produced by using a conventional film-manufacturing facility in high productivity using roll to roll manufacturing processes.

These and other advantages will be apparent from the detailed description below.

The term "diffuser" means any material that is able to diffuse specular light (light with a primary direction) to a diffuse light (light with random light direction). The term "light diffusion elements" means any element that is able to diffuse specular light (light with a primary direction) to a diffuse light (light with random light direction). The term "light" means visible light. The term "diffuse light transmission" means the percent diffusely transmitted light at 500 nm as compared to the total amount of light at 500 nm of the light source. The term "total light transmission" means percentage light transmitted through the sample at 500 nm as compared to the total amount of light at 500 nm of the light source. This includes both spectral and diffuse transmission of light. The term "diffusion efficiency" and "haze" means the ratio of % diffuse transmitted light at 500 nm to % total transmitted light at 500 nm multiplied by a factor of 100. "Transparent" means a film with total light transmission of 80% or greater at 500 nm.

The term "polymeric film" means a film comprising polymers. The term "polymer" means homo- and co-polymers. The term "average", with respect to lens size and frequency, means the arithmetic mean over the entire film surface area. "In any direction", with respect to lenslet arrangement on a film, means any direction in the x and y plane. The term "pattern" means any predetermined arrangement whether regular or random. The term "microbead" means polymeric spheres typically synthesized using the limited coalescence process. The term "substantially circular" means indicates a geometrical shape where the major axis is no more than two times the minor axis.

"Macro diffusion efficiency variation" means a diffusion efficiency variation that is greater than 5% between two locations that are separated by at least 2 cm. An optical gradient is a change in optical properties such as transmission, reflection, and light direction as a function of distance from a stating point. Useful examples of an optical gradient include a light transmission gradient, a light diffusion gradient and light adsorption gradient. "Gradient", in reference to diffusion, means the gradual increasing or decreasing of diffusion efficiency relative to distance from a starting point.

In one embodiment of the invention, the diffusion film has a textured surface on at least one side, in the form of a plurality of random microlenses, or lenslets. The term "lenslet" means a small lens, but for the purposes of the present discussion, the terms lens and lenslet may be taken to be the same. The lenslets overlap to form complex lenses. "Complex lenses" means a major lens having on the surface thereof multiple minor lenses. "Major lenses" mean larger lenslets that the minor lenses are formed randomly on top of. "Minor lenses" mean lenses smaller than the major lenses that are formed on the major lenses. The term "concave" means curved like the surface of a sphere with the exterior surface of the sphere closest to the surface of the film. The term "convex" means curved like the surface of a sphere with the interior surface of the sphere closest to the surface of the film. The term "top surface" means the surface of the film farther from the light source. The term "bottom surface" means the surface of the film closer to the light source.

The term "ordered" as used herein with respect to light diffusing elements means that all of the elements exhibit a repetitive pattern as to shape and location. The term "random" as used herein with respect to light diffusing elements means that at least some, preferably at least 2%, of the elements are not ordered. Too much order can diminish the quality of the projected image due to moire interference effects.

The "specular area" of the printed projection media is defined as where most of the light passing through that area of the media is transmitted specularly (not diffused). The haze value of light transmitted through this area is typically less than 30%. The "diffuse area" of the printed projection media is defined as where most of the light passing through that area of the media is diffusely transmitted. The haze value of light transmitted through this area is typically greater than 70%. "Printed projection media" in reference to the projection media means the projection media after it has been subjected to heat and/or pressure to partially or filly melt the light diffusing elements.

The surface of each lenslet is a locally spherical segment, which acts as a miniature lens to alter the ray path of energy passing through the lens. The shape of each lenslet is "semi-spherical" meaning that the surface of each lenslet is a sector of a sphere, but not necessarily a hemisphere. Its curved surface has a radius of curvature as measured relative to a first axis (x) parallel to the transparent polymeric film and a radius of curvature relative to second axis (y) parallel to the transparent polymeric film and orthogonal to the first axis (x). The lenses in an array film need not have equal dimensions in the x and y directions. The dimensions of the lenses, for example length in the x or y direction, are generally significantly smaller than a length or width of the film. "Height/Diameter ratio" means the ratio of the height of the complex lens to the diameter of the complex lens. "Diameter" means the largest dimension of the complex lenses in the x and y plane. The value of the height/diameter ratio is one of the main causes of the amount of light spreading, or diffusion that each complex lens creates. A small height/diameter ratio indicates that the diameter is much greater than the height of the lens creating a flatter, wider complex lens. A larger height/diameter value indicates a taller, skinner complex lens.

The divergence of light through the lens may be termed "asymmetric", which means that the divergence in the horizontal direction is different from the divergence in the vertical direction. The divergence curve is asymmetric, meaning that the direction of the peak light transmission is not along the direction $\theta=0°$, but is in a direction non-normal to the surface. "Void" is used herein to mean devoid of added solid and liquid matter, although it is likely the "voids" contain gas.

The average peak to valley height is less than 10 micrometers. When the diffusion elements are higher than 15 micrometers, it becomes difficult to fully flatten the diffusion elements. The printed areas would not be completely transparent leading to dimmer bright areas when projected and lowers contrast between the printed and un-printed areas in the projected image.

The light diffusing elements preferably have an average aspect ratio of 0.1 to 1.0. When the aspect ratio of the diffusing elements is less than 0.07, the amount of curvature is too low to sufficiently diffuse the light transmitted though the projection film. The result is the areas of the displayed projection film that were non-imaged and supposed to be dark, would be lighter because the diffusion elements would not direct the light away from the collection lens and lower contrast of the projected image would occur. When the aspect ratio of the diffusion elements is greater than 2.0, it becomes difficult to fully flatten the diffusion elements and the printed areas would not be completely transparent leading to dimmer bright areas when projected lower contrast between the printed and non-printed areas in the projected image. Furthermore, when the aspect ratio of the light diffusing elements is greater than 2.0, internal reflection occurs and some of the incident light is reflected back towards the light source. This lowers the overall transmission and brightness of the printed areas.

The light diffusing elements containing titanium dioxide particles less than 30 nanometers are preferred because of added strength to the projection media without significantly changing the transmission or diffusion characteristics of the projection media. Adding strength and stiffness to the projection media is important for transport through a printing system and handling. In small addition quantities, the addition of nano-TiO$_2$ does not affect the transmission and diffusion characteristics significantly is because the particles are below the wavelength of light and therefore do not scatter light.

When the light diffusing elements have a glass transition temperature of over 82 degrees Celsius it becomes difficult to melt the lenses quickly and it takes more energy to melt the lenses. If the high heat and time is not applied to the lenses (which increases the printing cost of the media significantly), then the lenses do not fully melt and retain some of the diffusion characteristics of the original diffusion elements. When projected, the not-fully melted lenses will deflect some of the light away from the collection lens as it passes through the film and the projected "bright" areas will not be as bright. This makes colors (if they are added to the printed areas) less saturated and have less chroma and the projected image will lack contrast between the printed and un-printed areas resulting in an unpleasing image to the viewer and ambient lighting may have to be dimmed to compensate for the lower contrast.

Having the diffusing elements with a glass transition temperature of less than 55 degrees Celsius is preferred. It has been shown that less than when a the diffusion lenses have a Tg of less than 55° C. very efficient melting occurs when printing, the dye or other colorant transfers well from the donor to the projection media, and the areas printed are fully melted to form transparent areas with very low haze values.

The polymer layer can comprise a dye-receiving layer (DRL). This DRL is preferred so that the dye that is thermally transferred is more efficiently transferred and mordant into the receiving projection media. Having a DRL yields saturated, truer colors and an ability to replicate more of the Pantone® color space. The primary requirement is that the DRL is compatible with the colorant with which it will be imaged so as to yield the desirable color gamut and density.

The polymer layer that is an UV curable polymer is preferred. The UV curable polymer would begin as an uncured polymer with light diffusing elements. The polymer sheet would be subjected to heat and/or pressure making areas of specular and diffuse transmission. The sheet would then be cured making it mostly invariable to heat and/or pressure. The resulting printed sheet would have areas of specular and diffuse transmission permanently. The sheet would be hard and durable to resist scratching. Using an UV polymer system adds a security feature to the overhead projection media in that the media can not be written once the media has been cured.

Preferably, the polymer layer comprises a polyolefin. Polyolefins are low in cost and high in light transmission. Further, polyolefin polymers are efficiently melt extrudable and therefore can be used to create projection media in roll form. Furthermore, most polyolefins have a low Tg (below 75° C.) allowing for the easy change of diffusivity by melting the light diffusing elements.

In another embodiment of the invention, the polymer layer comprises polyester. Polyesters are low in cost and have good strength and surface properties. Polyesters have high optical transmission values that allow for high light transmission and diffusion. This high light transmission and diffusion allows for greater differences in the bright and dark projected areas increasing contrast.

In another embodiment of the invention, the polymer layer comprises a polycarbonate. The diffusion elements formed out of polycarbonate are easily melted to form areas of specular and diffuse transmission. Polycarbonates have high optical transmission values that allow for high light transmission and diffusion. This high light transmission and diffusion allows for greater differences in the bright and dark projected areas increasing contrast.

The polymer layer preferably comprises a colorant. This would provide a simple projection media that is projected as one color on a background of gray. No matter what color the un-printed diffuse areas are, the diffuse areas appear dark because the light that passes through the diffuse areas is mostly directed away from the collecting lens. This is advantaged because there would be no need to transfer dyes when the light diffusing elements are altered. For example, a page of text could be printed on a projection media that has a blue coloration to it. When projected the image will have a dark gray background surrounding blue text. More preferably, the polymer layer comprises dye or pigment. Pigment and dye have excellent color reproduction and color stability. They are able to create a large color gamut and saturation. Furthermore, they are easily incorporated into extrusions and coatings of the polymer layer. Nano-sized pigments can also be used, with the advantage that less of the pigment is needed to achieve the same color saturation because the pigment particles are so small they are more efficient at adding color.

Preferably the projection media comprises a transparent substrate. The substrate provides dimensional stability to the projection media as well as stiffness, thickness to make it well suited to the system for printing the projection media. It is preferable to be transparent to project as much light through the specular parts so have increased contrast between the printed and non-printed areas. Most preferably, the substrate has a light transmission of at least 85%. It has been shown that a substrate with at least 85% light transmission has an acceptable level of contrast between the printed and non-printed areas of the projected image.

The projection media (non-printed) preferably has a haze value of at least 70%. This amount of haze is needed to sufficiently deflect the light away from the collecting lens and make the diffuse areas project as dark areas. If the projection media has a haze value of less than 65%, then a percentage of the light transmitted through the projection media would not be deflected from the collection lens resulting in lighter dark areas. The smaller difference between the lighter dark areas and the printed bright areas would cause contrast to be less and make the projected image more difficult to view.

The projection media preferably has a pressure sensitive adhesive. The pressure sensitive adhesive can be permanent or repositionable. The pressure sensitive adhesive can be used to keep the projection media in place when displaying on an overhead projection apparatus. The adhesive preferably is coated or applied to the base sheet. A preferred pressure sensitive adhesive is an acrylic-based adhesive. Acrylic adhesives have been shown to provide an excellent bond between plastics. The preferred adhesive materials may be applied using a variety of methods known in the art to produce thin, consistent adhesive coatings. Examples include gravure coating, rod coating, reverse roll coating and hopper coating.

The contrast ratio of the projection media, when projected, is 250:1. This means that the brightest areas are 250 times as bright as the dark areas. The amount of contrast below 200:1 is undesirable and it could become necessary to dim the ambient lighting to more easily see the projected image.

The projection media preferably comprises specular areas of transmission. These areas will display as bright areas against a darker background (un-printed areas) when projected by an overhead projection system. Preferably, color is added to the areas of specular transmission. When printing the projection media and creating areas of specular transmission, color can be added so that when projected the specular areas are colored. Multiple colors can be added to each sheet enabling an interesting and appealing display material. Furthermore, color is easily added at the same time the specular areas are created using dyes that sublimate and a thermal printer. This is advantaged because there are no registration issues between the areas of color (dye sublimation) and the areas of specular transmission because they are created at the same time using a printing technique that is inexpensive and already supported by the printing industry. The color added is preferably a dye because dyes are transparent so the colored areas show up bright and colored when projected, increasing the contrast between the printed and non-printed areas.

In one embodiment of the invention, the light diffusion layer comprises a binder and a light diffusive agent dispersed in the binder. The light diffusing elements are preferably polymeric beads. The polymeric beads are typically found in a polymer binder and the size, distribution, and density control the amount of the diffusion. Beads can be spherical or aspherical. How thick a polymer the beads are coated in can alter the amount of diffusion. Using these light diffusing elements and binder, the amount of diffusion and how dark the projected area through projection film on the screen can be easily tailored.

As the resin of the light diffusion layer, thermosetting resins such as thermosetting urethane resins consisting of acrylic polyol and isocyanate prepolymer, phenol resins, epoxy resins, unsaturated polyester resins or the like, and thermoplastic resins such as polycarbonates, thermoplastic acrylic resins, ethylene vinyl acetate copolymer resins or the like may be included.

As the light diffusive element contained in the light diffusion layer, synthetic resin beads such as polymethyl methacrylate (PMMA) beads, silicone beads, styrene beads or the like can be used alone or in any combination thereof.

The particle size of the bead, which is determined properly relative to the thickness of the light diffusion layer, may be an average particle size of 1 to 30 micrometers and preferably has a narrow distribution. The light diffusive element increases the light diffusibility by at least the part of the particles thereof protruding from the surface of the light diffusion layer, the average particle size should be in such a range that part of the particles can protrude from the surface of the light diffusion layer.

Preferably, the light diffusing elements are lenses. Curved concave and convex polymer lenses have been shown to provide very efficient diffusion of light and high transparency, enabling a high contrast between the projected specular areas and diffuse areas. The lenses can vary in dimensions or frequency to control the amount of diffusion achieved. A high aspect ratio lens would diffuse the light more than a flatter, lower aspect ratio lens and provide a projected darker area through the higher aspect ratio lenses (example 0.8).

In another embodiment of the invention, the light diffusing elements are preferably complex lenses. Complex lenses are lenses on top of other lenses. They have been shown to provide very efficient diffusion of light and high transparency, enabling a high contrast between the projected specular areas and diffuse areas. The amount of diffusion is easily altered by changing the complexity, geometry, size, or frequency of the complex lenses to achieve the desired darkness of the diffuse areas of the projected projection media.

The plurality of lenses of all different sizes and shapes are formed on top of one another to create a complex lens feature resembling a cauliflower. The lenslets and complex lenses formed by the lenslets can be concave into the transparent polymeric film or convex out of the transparent polymeric film.

One embodiment of the present invention could be likened to the moon's cratered surface. Asteroids that hit the moon form craters apart from other craters, that overlap a piece of another crater, that form within another crater, or that engulf another crater. As more craters are carved, the surface of the moon becomes a complexity of depressions like the complexity of lenses formed in the transparent polymeric film.

The complex lenses may differ in size, shape, off-set from optical axis, and focal length. The curvature, depth, size, spacing, materials of construction (which determines the basic refractive indices of the polymer film and the substrate), and positioning of the lenslets determine the degree of diffusion, and these parameters are established during manufacture according to the invention.

The result of using a diffusion film having lenses whose optical axes are off-set from the center of the respective lens results in dispersing light from the film in an asymmetric manner. It will be appreciated, however, that the lens surface may be formed so that the optical axis is off-set from the center of the lens in both the x and y directions.

The lenslet structure can be manufactured on the opposite sides of the substrate. The lenslet structures on either side of the support can vary in curvature, depth, size, spacing, and positioning of the lenslets.

A projection media wherein the diffusion efficiency varies more than 5 percent in two different locations of the diffuser is preferred. A diffusion efficiency that varies less than 3 percent could be caused by variations in the diffusion film caused by manufacturing process variations. Most preferred is a diffusion efficiency that varies more than 10 or more than 50 percent in two different locations of the diffuser. It has been shown that over 50 percent variation in two different locations of the diffuser film produces a film that has contrast between the two diffusion efficiencies when projected with an overhead projection system.

A projection media wherein the diffusion efficiency variation comprises a gradient is preferred. Have a gradient allows for the smooth transition from bright to darker areas of the projected display and can be used in combination with color gradients. The diffusion efficiency of the light diffusing elements can change by printing by the following mathematical variations, for example:

Diffusion efficiency=$e^{1/distance}$ or $e^{-1/distance}$

Diffusion efficiency=1/distance or −1/distance

Diffusion efficiency=distance*x or −distance*x (where x is a real number)

Each specific light diffusing application determines the amount of variation needed and the rate at which diffusion efficiency changes with respect to distance.

The concave or complex lenses on the surface of the polymer film are preferably randomly placed. Random placement of lenses increases the diffusion efficiency of the invention materials. Further, by avoiding a concave or convex placement of lenses that is ordered, undesirable optical interference patterns that could be distracting to the viewer are avoided.

In an embodiment of the invention, the light diffusing elements are located on both sides of the transparent polymer sheet. By placing the light diffusing elements on both sides of the support, more efficient light diffusion is observed compared to the light diffusion elements on one side. Both sides can be printed in registration to provide more saturated colors (as the light is transmitted through two colored and specular areas) and a darker dark as the light is transmitted through light layers of light diffusing elements. The sides can be printed differently creating levels of gray and color projected for an interesting display.

Preferably, the concave or convex lenses have an average frequency in any direction of from 5 to 250 complex lenses/mm. When a film has an average of 285 complex lenses/mm, creates the width of the lenses approach the wavelength of light. The lenses will impart a color to the light passing through the lenses and add unwanted color to the projected image. Having less than 4 lenses per millimeter creates lenses that are too large and therefore diffuse the light less efficiently. Concave or convex lenses with an average frequency in any direction of between 22 and 66 complex lenses/mm are more preferred. It has been shown that an average frequency of between 22 and 66 complex lenses provide efficient light diffusion and can be efficiently manufactured utilizing cast coated polymer against a randomly patterned roll.

The light diffusion elements have concave or convex lenses at an average width between 3 and 60 microns in the x and y direction. When lenses have sizes below 1 micron the lenses impart a color shift in the light passing through because the lenses dimensions are on the order of the wavelength of light and add unwanted color to the projected image. When the lenses have an average width in the x or y direction of more than 68 microns, the lenses is too large to diffuse the light efficiently. More preferred, the concave or convex lenses at an average width between 15 and 40 microns in the x and y direction. This size lenses has been shown to create the most efficient diffusion and a high level of contrast in the projected image.

The concave or convex complex lenses comprising minor lenses wherein the width in the x and y direction of the smaller lenses is preferably between 2 and 20 microns. When minor lenses have sizes below 1 micron the lenses impart a color shift in the light passing through because the lenses dimensions are on the order of the wavelength of light and add unwanted color to the projected image. When the minor lenses have sizes above 25 microns, the diffusion efficiency is decreased because the complexity of the lenses is reduced. More preferred are the minor lenses having a width in the x and y direction between 3 and 8 microns. This range has been shown to create the most efficient diffusion.

The number of minor lenses per major lens is preferably from 2 to 60. When a major lens has one or no minor lenses, its complexity is reduced and therefore it does not diffuse as efficiently. When a major lens has more than 70 minor lens contained on it, the width of some of the minor lens approaches the wavelength of light and imparts a color to the light transmitted. Most preferred are from 5 to 18 minor lenses per major lens. This range has been shown to produce the most efficient diffusion.

Preferably, the concave or convex lenses are semispherical meaning that the surface of each lenslet is a sector of a sphere, but not necessarily a hemisphere. This provides excellent even diffusion over the x-y plane. The semispherical shaped lenses scatter the incident light uniformly, ideal for a display application where the display area needs to be diffused uniformly.

In another embodiment the transparent substrate comprises a carbonate repeating unit. Polycarbonates have high optical transmission values compared to polyolefin polymers and therefore can improve the brightness of display devices.

In another embodiment of the invention, the transparent substrate comprises an olefin repeating unit. Polyolefins are low in cost and have good strength and surface properties.

In another embodiment of the invention the transparent substrate comprises a cellulose acetate. Tri acetyl cellulose has both high optical transmission and low optical birefringence allowing the diffuser of the invention to both diffuse light and reduce unwanted optical patterns.

The thickness of the projection media preferably is not more than 250 micrometers or more preferably from 25 to 150 micrometers. When the projection film is 25–150 micrometers thick it is easy to handle, has stability and can be processed easily through a printing apparatus. When the projection film is over 250 micrometers thick, less light is transmitted through the film causing lower contrast in the projected image. Further, by reducing the thickness of the projection media, the materials content of the diffusion elements are reduced.

Since the projection media of the invention typically is used in a projection system, the projection media with an elastic modulus greater than 500 MPa is preferred. Further, because the projection media is mechanically tough, it is better able to with stand the rigors of handling and projection. A projection media with an impact resistance greater than 0.6 GPa is preferred. An impact resistance greater than 0.6 GPa allows the projection media to resist scratching and mechanical deformation.

The projection media preferably comprises voided structures. The voided structure can be throughout the entire projection media, but is preferably in a skin layer on a polymer substrate as it is easier to melt a thin layer of voids. Voided structures are less susceptible to scratches, which can affect operating performance. Also, because the voids are typically filled with air, the projection film has more of a white appearance in non-printed areas so that the content printed on the media is more easily readable (clear or colored areas on a white background) without an overhead projector. Furthermore, voided structures are easily changed during manufacturing to have different degrees of diffusion and transmission to be adapted to each overhead display system.

Microvoids of air in a polymer matrix are preferred and have been shown to be a very efficient diffuser of light and easily melted by heat and/or pressure. The microvoided layers containing air have a large index of refraction difference between the air contained in the voids (n=1) and the polymer matrix (n=1.2 to 1.8). This large index of refraction difference provides excellent diffusion and high light transmission.

An index of refraction difference between the air void and the thermoplastic matrix is preferably greater than 0.2. An index of refraction difference greater than 0.2 has been shown to provide excellent diffusion and high contrast in the projected printed projection media as well as allowing the diffusion to take place in a thin film. The diffusion elements preferably contains at least 4 index of refraction changes greater than 0.2 in the vertical direction. Greater than 4 index of refraction changes have been shown to provide enough diffusion for an overhead projection application. 30 or more index of refraction differences in the vertical direction, while providing excellent diffusion, significantly reduces the amount of transmitted light, is difficult to completely collapse leading to lower contrast of the projected images.

The light diffusion elements are preferably a surface diffuser. A surface diffuser utilizes with its rough surface exposed to air, affording the largest possible difference in index of refraction between the material of the diffuser and the surrounding medium and, consequently, the largest angular spread for incident light and very efficient diffusion.

The light diffusion elements comprising a surface microstructure are preferred. A surface microstructure is easily altered in design of the surface structures and altered in with heat and/or pressure to achieve a macro diffusion efficiency variation. Microstructures can be tuned for different diffusion efficiencies and how much they spread light. Examples of microstructures are a simple or complex lenses, prisms, pyramids, and cubes. The shape, geometry, and size of the microstructures can be changed to accomplish the desired diffusion change. A surface diffuser utilizes with its rough surface exposed to air, affording the largest possible difference in index of refraction between the material of the diffuser and the surrounding medium and, consequently, the largest angular spread for incident light and very efficient diffusion.

In another embodiment of the invention, a bulk diffuser is preferred. A bulk diffuser can be manufactured with a macro diffusion efficiency variation, or can be subjected to heat and/or pressure to produce the variation. Further, the bulk diffuser relies on index of refraction changes through the film, not needing an air interface to work efficiently.

The projection media (lenses on the complex lens diffuser, voids in the bulk voided diffuser, or surface texture on a surface diffuser) can be altered using heat and/or pressure. The process consists of using heat and/or pressure in a gradient or pattern to produce a variable diffusion film. When heat and/or pressure is applied to the projection film, the polymer diffusion element partially or fully melts and flows and cools to form a new structure where most or all of the light diffusing element is flattened. In the case of the projection film with complex lenses as the light diffusion element, heat and/or pressure will melt the lenses (which are preferably made up of thermoplastic) and will reform to create newly shaped lenses that are shallower than the original lenses or a smooth polymer surface. This smooth polymer film allows light to pass through the printed areas specularly. Heat and/or pressure is a way to selectively turn parts diffuse parts of the projection film into partially diffuse or specular areas of the projection film and can be applied in a very precise way to create specular dots, lines, patterns, and text. Heat and/or pressure applied to a projection film with voided polymer will melt the polymer and close the voids to the extent at which the heat is applied. The voids can be partially melted and less diffuse, or melted completely creating a specular region in the bulk voided diffuser.

Preferably, the heat and/or pressure is applied by a resistive thermal head. The resistive thermal head, such as a print head found in a thermal printer, uses heat and pressure to melt the light diffusing elements to create areas of specular transmission. As the printer prints, the printer head heats the polymer sheet and supplies pressure to deform or completely melt the light diffusion elements. This process is preferred because it has accurate resolution, can create clear areas or add color at the same time as melting the lenses, and uses heats and pressures to melt a range of polymers. The resolution of the areas of diffuse, semi-diffuse and specular depends on the resolution of the print head. Preferably, color is added to the areas of specular transmission. When printing the projection media and creating areas of specular transmission, color can be added so that when projected the specular areas are colored. Transferring color while creating specular areas is advantaged because multiple colors can be added to each sheet. The color added is preferably a dye because dyes are transparent so the colored areas show up bright and colored when projected, increasing the contrast between the printed and non-printed areas. Furthermore, dyes are easily added at the same time the specular areas are created using dyes that sublimate and a thermal printer. This is advantaged because there are no registration issues between the areas of color (with dye) and the areas of specular transmission because they are created at the same time using a printing technique that is inexpensive and already supported by the printing industry. Preferably, the projection media with efficiency variation can create patterns, text, and pictures by diffusing light selectively to create areas of diffusion, less diffusion, and no diffusion (specular). This enables the creation of visually interesting and easily viewed projected images.

FIG. 1 illustrates a cross section of one embodiment of the projection media before printing 1. Transparent layer 2 has complex lenses 4, which serve to diffuse the light on the surface of the transparent substrate 2. The average peak to height distance 6 is preferably less than 10 micrometers.

Figure 2:
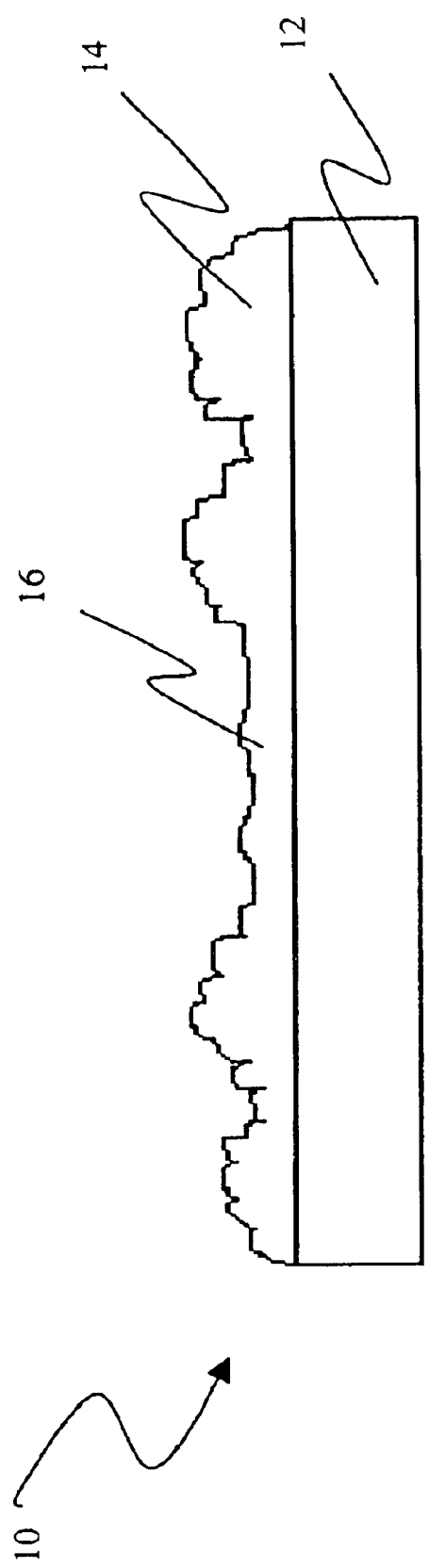
FIG. 2 illustrates a cross section of a projection media with complex lenses after printing suitable for use in an overhead projection system.

FIG. 2 illustrates a cross section of one embodiment of the projection media after printing 10. Transparent layer 12 has complex lenses 14 on the surface which serve to diffuse light and a flattened complex lens area 16 on the surface of the transparent layer 12.

Figure 3:
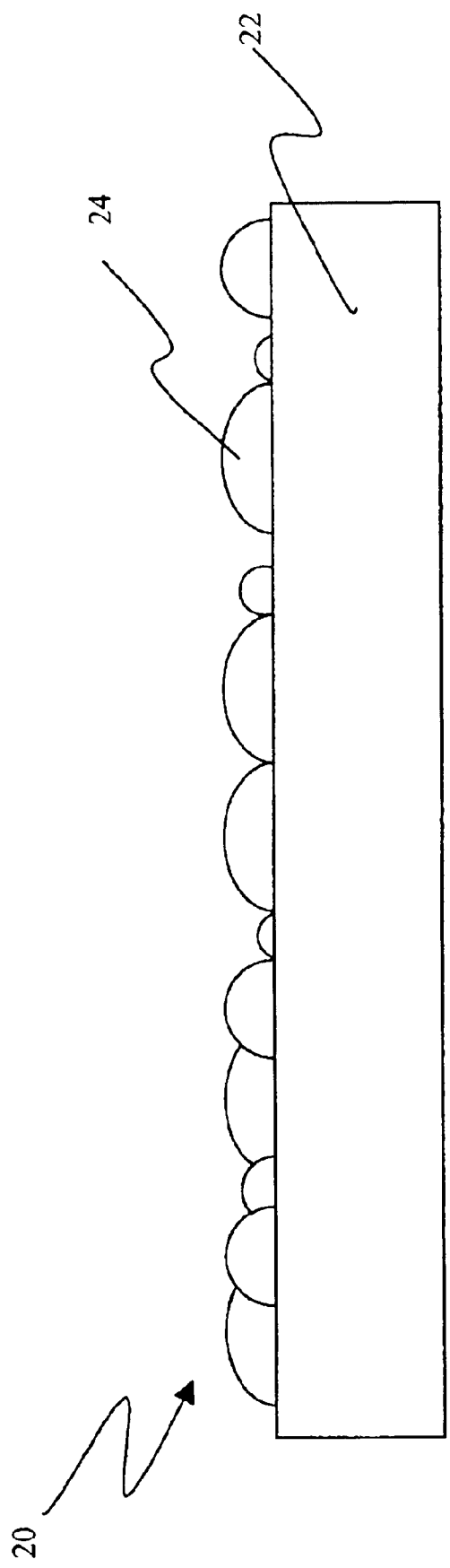
FIG. 3 illustrates a cross section of a projection media with lenses suitable for use in an overhead projection system.

FIG. 3 illustrates a cross section of another embodiment of the projection media before printing 20. Transparent layer 22 has lenses 24, which serve to diffuse the light on the surface of the transparent substrate 22.

Figure 4:
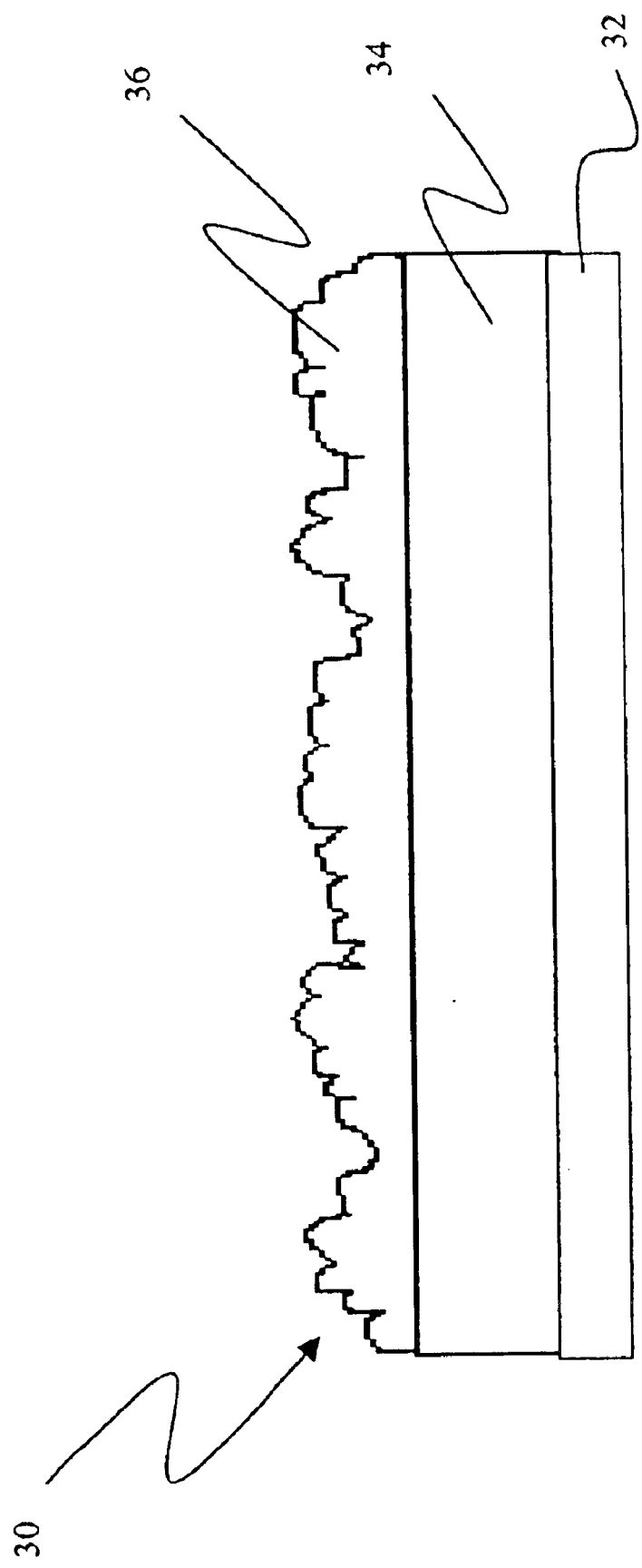
FIG. 4 illustrates a cross section of a projection media with a dye receiving layer and a pressure sensitive adhesive suitable for use in an overhead projection system.

FIG. 4 illustrates a cross section of another embodiment of the projection media before printing 30. On one side of the transparent layer 34 there is a pressure sensitive adhesive 32, and on the other side of the transparent layer 34 there is a dye receiving layer 36. In this embodiment the dye receiving layer also acts as the light diffusing layer.

Figure 5:
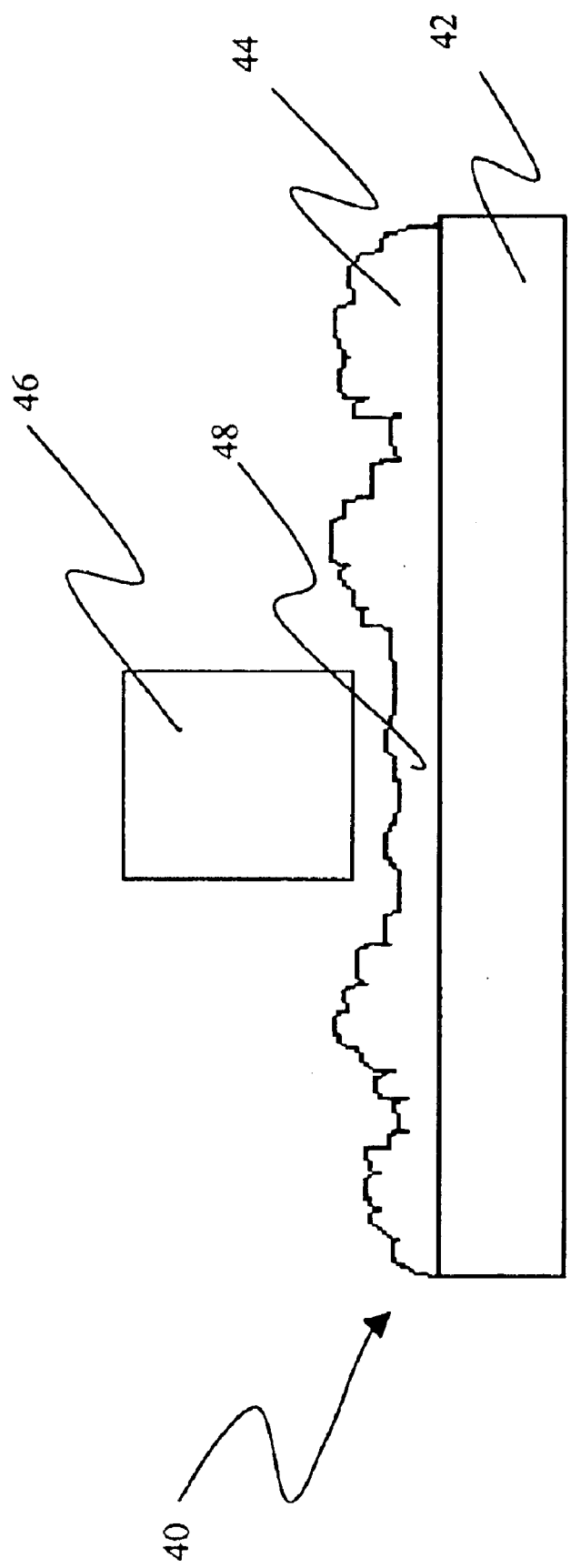
FIG. 5 illustrates an apparatus to apply heat and/or pressure selectively to create areas of specular transmission and a cross section of a projection media being printed.

FIG. 5 illustrates an apparatus to apply heat and/or pressure selectively to create areas of specular transmission 40. Transparent layer 42 has complex lenses 44 on the surface which serve to diffuse light and an area where print head 46 is applying heat and/or pressure 48 in which the complex lenses are being flattened. The print head 46 is applying the heat and/or pressure to flatten the complex lenses.

Figure 6:
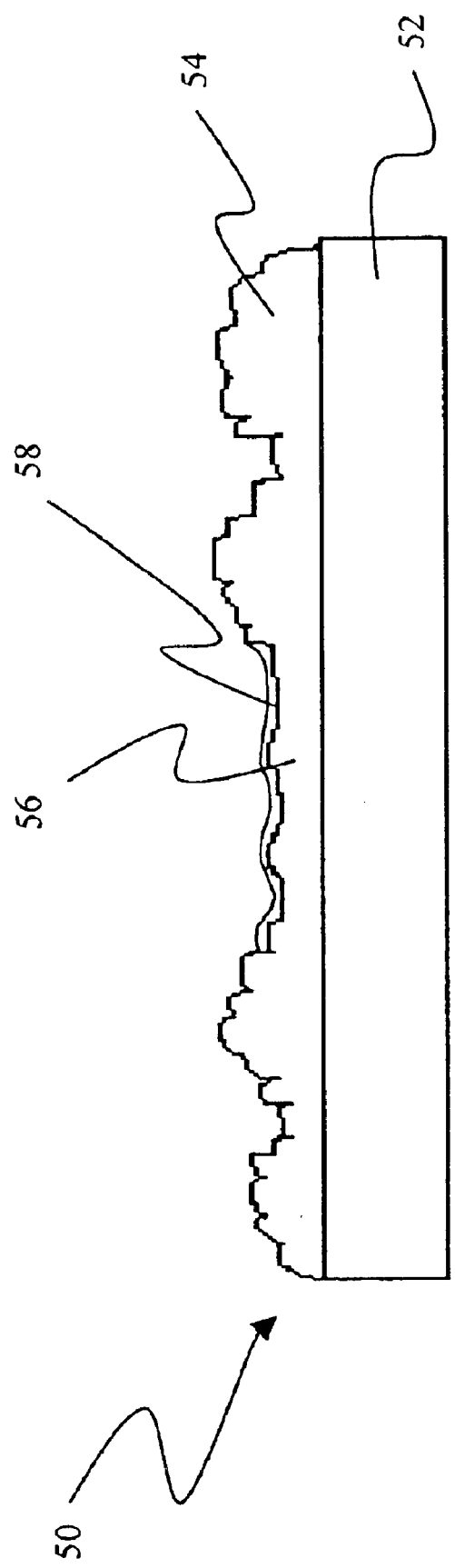
FIG. 6 illustrates a cross section of projection media with color added to the area of specular transmission.

FIG. 6 illustrates a cross section of projection media with color added to the area of specular transmission 50. Transparent layer 52 has complex lenses 54, which serve to diffuse the light on the surface of the transparent substrate 52 and areas of specular transmission 56. The areas of specular transmission 56 have color 58 added to them.

Figure 7:
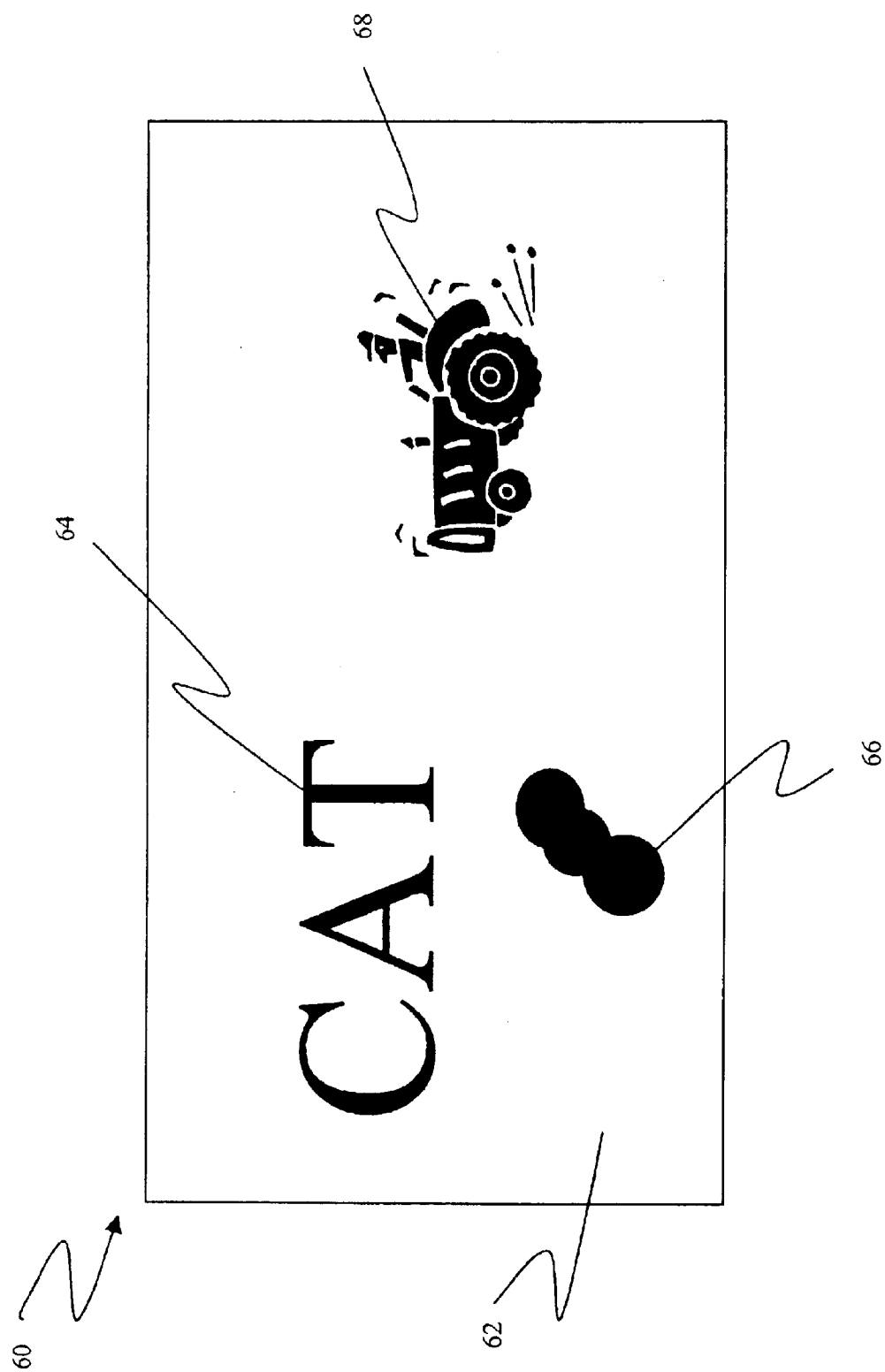
FIG. 7 illustrates a printed projection media with specular transmission areas in the form of text, shapes, and images.

FIG. 7 illustrates a printed projection media 60. The unprinted areas 62 contain light diffusing elements. The text 64, shape 66, and image 68 are areas of specular transmission.

Figure 8:
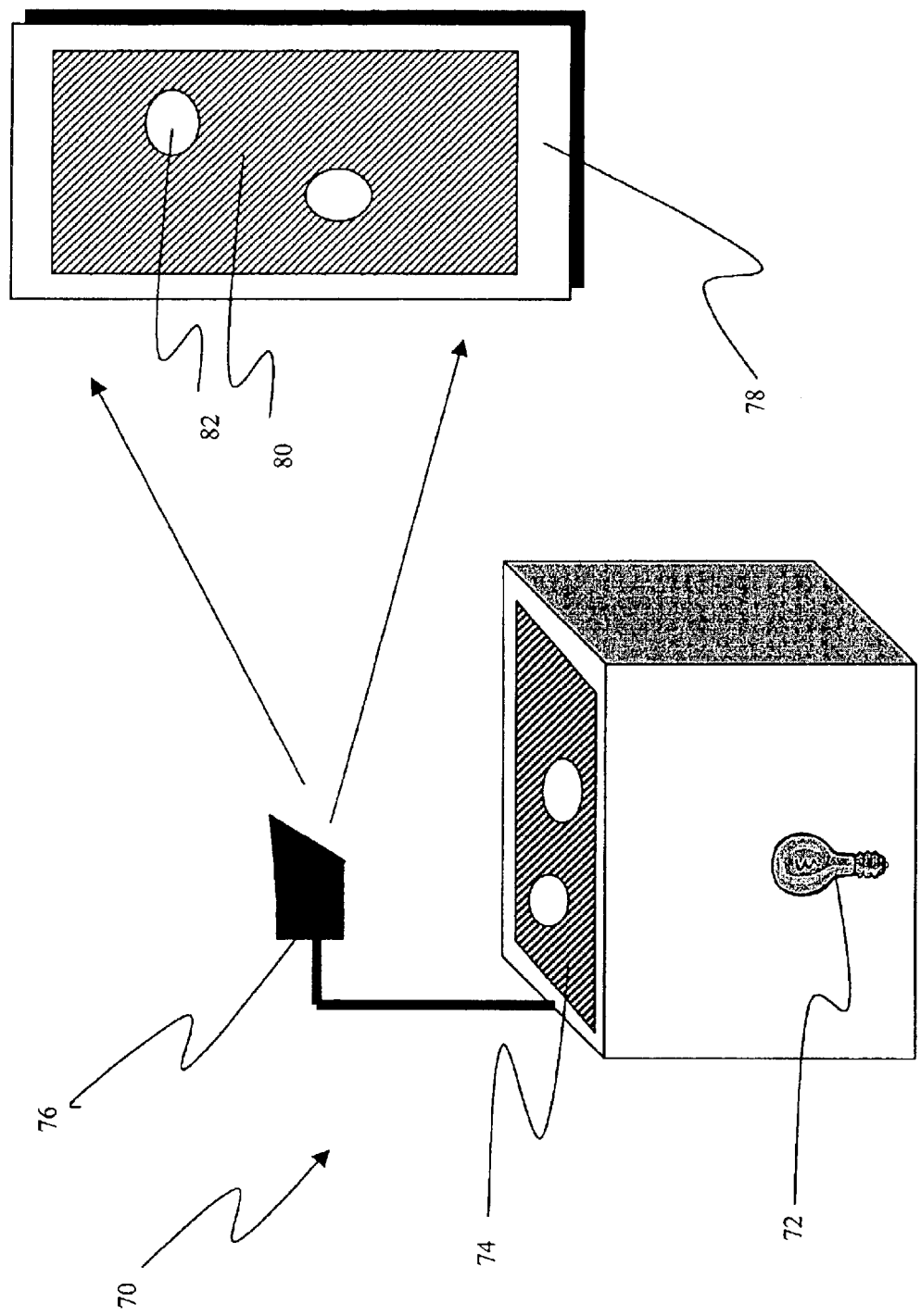
FIG. 8 a projection system utilizing the printed projection media of the invention.

FIG. 8 shows a projection system 70 utilizing the printed projection media 74 of the invention. Light from the light source 72 passes through the printed projection media 74. The light that passes through the printed projection media specularly is collected by the projection lens unit 76 and projected onto a projection screen 78. The darker projected areas 80 are from the non-printed areas on the printed projection media and the bright projected areas 82 correspond to the printed areas of the printed projection media.

For the projection media of the invention, micro-voided composite biaxially oriented polyolefin sheets are preferred and are manufactured by co-extrusion of the core and surface layer(s), followed by biaxial orientation, whereby voids are formed around void-initiating material contained in the core layer. For the biaxially oriented layer, suitable classes of thermoplastic polymers for the biaxially oriented sheet and the core matrix-polymer of the preferred composite sheet comprise polyolefins. Suitable polyolefins include polypropylene, polyethylene, polymethylpentene, polystyrene, polybutylene and mixtures thereof. Polyolefin copolymers, including copolymers of propylene and ethylene such as hexene, butene, and octene are also useful. Polyethylene is preferred, as it is low in cost and has desirable strength properties. Such composite sheets are disclosed in, for example, U.S. Pat. Nos. 4,377,616; 4,758,462 and 4,632,869. The projection media film comprises a polymer sheet with at least one voided polymer layer and could contain nonvoided polyester polymer layer(s). It should comprise a void space between about 2 and 60% by volume of said voided layer of said polymer sheet. Such a void concentration is desirable to optimize the transmission and reflective properties while providing adequate diffusing power to hide back lights and filaments. The thickness of the micro void-containing oriented film of the present invention is preferably about 1 micrometer to 400 micrometer, more preferably 5 to 200 micrometers.

The projection media of the invention is preferably provided with one or more nonvoided skin layers adjacent to the microvoided layer. The nonvoided skin layers of the composite sheet can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core. Any suitable polyester sheet may be utilized for the member provided that it is oriented. The orientation provides added strength to the multi-layer structure that provides enhanced handling properties when displays are assembled. Microvoided oriented sheets are preferred because the voids provide opacity without the use of $TiO_2$. Microvoided layers are conveniently manufactured by co-extrusion of the core and thin layers followed by biaxial orientation, whereby voids are formed around void-initiating material contained in the thin layers.

Polyester microvoided light diffusion elements are also preferred as oriented polyester has excellent strength, impact resistance and chemical resistance. The polyester utilized in the invention should have a glass transition temperature between about 50° C. and about 150° C., preferably about 60–100° C., should be orientable, and have an intrinsic viscosity of at least 0.50, preferably 0.6 to 0.9. Suitable polyesters include those produced from aromatic, aliphatic, or cyclo-aliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoiso-phthalic, and mixtures thereof. Examples of suitable glycols include ethylene glycol, propylene glycol, butanediol, pentanediol, hexanediol, 1,4-cyclohexane-dimethanol, diethylene glycol, other polyethylene glycols and mixtures thereof. Such polyesters are well known in the art and may be produced by well-known techniques, e.g., those described in U.S. Pat. Nos. 2,465,319 and 2,901,466. Preferred continuous matrix polymers are those having repeat units from terephthalic acid or naphthalene dicarboxylic acid and at least one glycol selected from ethylene glycol, 1,4-butanediol, and 1,4-cyclohexanedimethanol. Poly(ethylene terephthalate), which may be modified by small amounts of other monomers, is especially preferred. Polypropylene is also useful. Other suitable polyesters include liquid crystal copolyesters formed by the inclusion of a suitable amount of a co-acid component such as stilbene dicarboxylic acid. Examples of such liquid crystal copolyesters are those disclosed in U.S. Pat. Nos. 4,420,607; 4,459,402; and 4,468,510.

The co-extrusion, quenching, orienting, and heat setting of polyester diffuser sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers while restraining to some degree the sheet against retraction in both directions of stretching.

The microvoid-containing oriented film of the present invention has a function to diffuse the light. A periodically varying refractive index distribution formed by these numerous microvoids and micro-lens formed by the micro voided forms a structure like a diffraction grating to contribute to the optical property to scatter the light. The voided thermoplastic diffuser sheet provides excellent scattering of light while having a high % light transmission. The void-initiating particles which remain in the finished packaging sheet core should be from 0.1 to 10 micrometers in diameter, preferably round in shape, to produce voids of the desired shape and size. Voids resulting from the use of initiating particles of this size are termed "microvoids" herein. The voids exhibit a dimension of 10 micrometers or less in the unoriented thickness or Z direction of the layer. The size of the void is also dependent on the degree of orientation in the machine and transverse directions. Ideally, the void would assume a shape that is defined by two opposed and edge contacting concave disks. In other words, the voids tend to have a substantially circular cross section in the plane perpendicular to the direction of the light energy (also termed the vertical direction herein). The voids are oriented so that the two major dimensions (major axis and minor axis) are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

Substantially circular voids, or voids whose major axis to minor axis is between 2.0 and 0.5 are preferred as substantially circular voids have been shown to provide efficient diffusion of light energy and reduce uneven diffusion of light energy. A major axis diameter to minor axis diameter ratio of less than 2.0 is preferred. A ratio of less than 2.0 has been shown to provide excellent diffusion of LC light sources. Further, a ratio greater than 3.0 yields voids that are spherical and spherical voids have been shown to provide uneven dispersion of light. A ratio between 1.0 and 1.6 is most preferred as light diffusion and light transmission is optimized.

A microvoid is a void in the polymer layer of the diffuser that has a volume less than 100 micrometers. Microvoids larger than 100 micrometers are capable of diffusing visible light, however, because the void size is large, uneven diffusion of the light occurs resulting in uneven lighting of display devices. A thermoplastic microvoid volume between 8 and 42 cubic micrometers is preferred. A microvoided volume less than 6 cubic micrometers is difficult to obtain as the voiding agent required for 6 cubic micrometers is to small to void with typical 3×3 orientation of polyester. A microvoid volume greater than 50 cubic micrometers, while providing diffusion, creates a thick diffusion layer requiring extra material and cost. The most preferred void volume for the thermoplastic diffuser is between 10 and 20 cubic micrometers. Between 10 and 20 cubic micrometers has been shown to provide excellent diffusion and transmission properties.

Methods of bilaterally orienting sheet or film material are well known in the art. Basically, such methods comprise stretching the sheet or film at least in the machine or longitudinal direction after it is cast or extruded an amount of about 1.5–10 times its original dimension. Such sheet or film may also be stretched in the transverse or cross-machine direction by apparatus and methods well known in the art, in amounts of generally 1.5–10 (usually 3–4 for polyesters and 6–10 for polypropylene) times the original dimension. Such apparatus and methods are well known in the art and are described in such U.S. Pat. No. 3,903,234.

The voids, or void spaces, referred to herein surrounding the microbeads are formed as the continuous matrix polymer is stretched at a temperature above the Tg of the matrix polymer. The microbeads of cross-linked polymer are relatively hard compared to the continuous matrix polymer. Also, due to the incompatibility and immiscibility between the microbead and the matrix polymer, the continuous matrix polymer slides over the microbeads as it is stretched, causing voids to be formed at the sides in the direction or directions of stretch, which voids elongate as the matrix polymer continues to be stretched. Thus, the final size and shape of the voids depends on the direction(s) and amount of stretching. If stretching is only in one direction, microvoids will form at the sides of the microbeads in the direction of stretching. If stretching is in two directions (bidirectional stretching), in effect such stretching has vector components extending radially from any given position to result in a doughnut-shaped void surrounding each microbead.

The preferred preform stretching operation simultaneously opens the microvoids and orients the matrix material. The final product properties depend on and can be controlled by stretching time-temperature relationships and on the type and degree of stretch. For maximum opacity and texture, the stretching is done just above the glass transition temperature of the matrix polymer. When stretching is done in the neighborhood of the higher glass transition temperature, both phases may stretch together and opacity decreases. In the former case, the materials are pulled apart, a mechanical anticompatibilization process.

The complex lenses of the invention preferably comprise polymers. Polymers are preferred as they are generally lower in cost compared to prior art glass lenses, have excellent optical properties and can be efficiently formed into lenses utilizing known processes such as melt extrusion, vacuum forming and injection molding. Preferred polymers for the formation of the complex lenses include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers to improve mechanical or optical properties can be used. Preferred polyamides for the transparent complex lenses include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the complex lenses include cellulose nitrate, cellulose triacetate, cellulose diacetate, cellulose acetate propionate, cellulose acetate butyrate, and mixtures or copolymers thereof. Preferably, polyvinyl resins include polyvinyl chloride, poly(vinyl acetal), and mixtures thereof. Copolymers of vinyl resins can also be utilized. Preferred polyesters for the complex lens of the invention include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof.

Additional layers preferably are added to the microvoided polyester diffusion sheet that may achieve added utility. Such layers might contain tints, antistatic materials, or different void-making materials to produce sheets of unique properties. Biaxially oriented sheets could be formed with surface layers that would provide an improved adhesion. The biaxially oriented extrusion could be carried out with as many as 10 layers if desired to achieve some particular desired property. Addenda are preferably added to a polyester skin layer to change the color of the imaging element. Colored pigments that can resist extrusion temperatures greater than 320 degrees Celsius are preferred, as temperatures greater than 320 degrees Celsius are necessary for co-extrusion of the skin layer.

Addenda of this invention could be an optical brightener. An optical brightener is substantially colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylaminocoumarin, 1-4-Bis (O-Cyanostyryl) Benzol and 2-Amino-4-Methyl Phenol. Optical brightener can be used in a skin layer leading to more efficient use of the optical brightener.

The polyester light diffusion elements may be coated or treated after the co-extrusion and orienting process or between casting and full orientation with any number of coatings which may be used to improve the properties of the sheets including printability, to provide a vapor barrier, to make them heat sealable, or to improve adhesion. Examples of this would be acrylic coatings for printability, coating polyvinylidene chloride for heat seal properties. Further examples include flame, plasma or corona discharge treatment to improve printability or adhesion. By having at least one nonvoided skin on the microvoided core, the tensile strength of the sheet is increased and makes it more manufacturable. It allows the sheets to be made at wider widths and higher draw ratios than when sheets are made with all layers voided. The non-voided layer(s) can be peeled off after manufacture of the film. Co-extruding the layers further simplifies the manufacturing process.

The light diffusion of the present invention may be used in combination with a film or sheet made of a transparent polymer. Examples of such polymer are polyesters such as polycarbonate, polyethylene terephthalate, polybutylene terephthalate and polyethylene naphthalate, acrylic polymers such as polymethyl methacrylate, and polyethylene, polypropylene, polystyrene, polyvinyl chloride, polyether sulfone, polysulfone, polyarylate and triacetyl cellulose. The projection media may be mounted to a glass sheet for support.

The projection media of the present invention may be incorporated with e.g. an additive or a lubricant such as silica for improving the drawability and the surface-slipperiness of the film within a range not to deteriorate the optical characteristics to vary the light-scattering property with an incident angle. Examples of such additive are organic solvents such as xylene, alcohols or ketones, fine particles of an acrylic resin, silicone resin or Δ metal oxide or a filler.

The projection media may be coated or treated before or after thermoplastic lenslet casting with any number of coatings which may be used to improve the properties of the sheets including printability, to provide a vapor barrier, to make them heat sealable, or to improve adhesion. Examples of this would be acrylic coatings for printability, coating polyvinylidene chloride for heat seal properties. Further examples include flame, plasma or corona discharge treatment to improve printability or adhesion.

The projection media of the invention may also be used in conjunction with a light diffuser, for example a bulk diffuser, a lenticular layer, a beaded layer, a surface diffuser, a holographic diffuser, a micro-structured diffuser, another lens array, or various combinations thereof. The lenslet diffuser film disperses, or diffuses, the light, thus destroying any diffraction pattern that may arise from the addition of an ordered periodic lens array. The lenslet diffuser film may be positioned before or after any diffuser or lens array.

The transparent polymeric film of the invention can also include, in another aspect, one or more optical coatings to improve optical transmission through one or more lenslet channels. It is often desirable to coat a diffuser with a layer of an anti-reflective (AR) coating in order to raise the efficiency of the diffuser.

It is known to produce transparent polymeric film having a resin coated on one surface thereof with the resin having a surface texture. This kind of transparent polymeric film is made by a thermoplastic embossing process in which raw (uncoated) transparent polymeric film is coated with a molten resin, such as polyethylene. The transparent polymeric film with the molten resin thereon is brought into contact with a chill roller having a surface pattern. Chilled water is pumped through the roller to extract heat from the resin, causing it to solidify and adhere to the transparent polymeric film. During this process the surface texture on the chill roller's surface is embossed into the resin coated transparent polymeric film. Thus, the surface pattern on the chill roller is critical to the surface produced in the resin on the coated transparent polymeric film.

In the manufacturing process for the complex lens light diffusion element projection media of the present invention, preferred lens polymers are melt extruded from a slit die. In general, a T die or a coat hanger die is preferably used. The process involves extruding the polymer or polymer blend through a slit die and rapidly quenching the extruded web upon a chilled casting drum with the preferred lens geometry so that the lens polymer component of the transparent sheet are quenched below their glass solidification temperature and retain the shape of the diffusion lens.

A method of fabricating a diffusion film assembly was developed. The preferred approach comprises the steps of providing a positive master chill roll having a plurality of complex lenses. The diffusion film is replicated from the master chill roller by casting a molten polymeric material to the face of the chill roll and transferring the polymeric material with lenslet structures onto a transparent polymeric film.

A chill roller is manufactured by a process including the steps of electroplating a layer of cooper onto the surface of a roller, and then abrasively blasting the surface of the copper layer with beads, such as glass or silicon dioxide, to create a surface texture with hemispherical features. The resulting blasted surface is bright nickel electroplated or chromed to a depth that results in a surface texture with the features either concave into the roll or convex out of the roll. Because of the release characteristics of the chill roll surface, the resin will not adhere to the surface of the roller.

The bead blasting operation is carried out using an automated direct pressure system in which the nozzle feed rate, nozzle distance from the roller surface, the roller rotation rate during the blasting operation and the velocity of the particles are accurately controlled to create the desired lenslet structure.

The number of features in the chill roll per area is determined by the bead size and the pattern depth. Larger bead diameters and deeper patterns result in fewer numbers of features in a given area. Therefore the number of features is inherently determined by the bead size and the pattern depth.

The projection media of the invention may also be manufactured by vacuum forming around a pattern, injection molding the lenses and embossing lenses in a polymer web. While these manufacturing techniques do yield acceptable lenses capable of efficiently diffusing light, melt cast coating polymer onto a patterned roll and subsequent transfer onto a transparent polymer web allows for the lenses of the invention to be formed into rolls thereby lowering the manufacturing cost for the diffusion lenses. Further, cast coating polymer has been shown to more efficiently replicate the desired complex lens geometry compared to embossing and vacuum forming.

The projection media can be transformed into a reflection film or a transflector film by applying a reflection layer composed of a metallic film, etc., to the variable diffusion elements of the film of the present invention can be used e.g. as a retroreflective member for a traffic sign. It can be used in a state applied to a car, a bicycle, person, etc. When the printed projection media is placed on a metallic film, it can cause the amount of reflection and diffusion reflection to vary across the film from diffuse to almost specular. This can create a reflection sign with sections diffuse and sections (such as text) as a mirror surface. The surface of the projection media can also be partially metallized as to create a variable diffusion transflector, an optical film in a LCD so that the LCD can be used in both reflection and transmission mode.

The projection media of the present invention also have significant architectural uses such as providing appropriate light for work and living spaces. In typical commercial applications, inexpensive transparent polymeric diffuser films are used to help diffuse light over the room.

Embodiments of the invention may provide not only improved increased contrast overhead projection displays, but also unique and interesting display media.

The entire contents of the patents and other publications referred to in this specification are incorporated herein by reference.

EXAMPLE

In this example, the projection of the invention was created by extrusion casting an extrusion grade polyolefin polymer against a pattered chill roll containing complex lens geometry. The patterned polyolefin polymer, in the form of the complex lenses was then transferred to a polyester web material thereby forming a projection material with light diffusion elements in the form of complex surface lenses. This example will show that the complex lenses formed on a transparent polymer web material and selective melting of the lenses and added coloration will produce a printed projection media. Further, it will be obvious that the projection media will be simply made and have mechanical properties that allow for use in overhead projection systems.

A patterned chill roll was manufactured by a process including the steps of abrasively blasting the surface of the chill roll with grit (can be glass or other materials) to create a surface texture with hemispherical features. The resulting blasted surface was chromed to a depth that results in a surface texture with the features either concave into the roll or convex out of the roll. The bead blasting operation was carried out using an automated direct pressure system in which the nozzle feed rate, nozzle distance from the roller surface, the roller rotation rate during the blasting operation and the velocity of the particles are accurately controlled to create the desired complex lens structure. The bead size and the pattern depth determine the number of features in the chill roll per area. Larger bead diameters and deeper patterns result in fewer numbers of features in a given area.

The complex lens patterned roll was manufactured by starting with a steel roll blank and grit blasting with size 14 grit at a pressure of 447 MPa. The roll was then chrome platted. The resulting complex lenses on the surface of the roll were convex.

The patterned chill roll was utilized to create projection media by extrusion coating a polyolefin polymer from a coat hanger slot die comprising substantially 96.5% LDPE (Eastman Chemical grade D4002P), 3% Zinc Oxide and 0.5% of calcium stearate onto a 100 micrometer transparent oriented web polyester web with a % light transmission of 94.2%. The polyolefin cast coating coverage was 25.88 g/m$^2$.

The invention materials containing complex lenses had randomly distributed lenses comprising a major lens with an average diameter of 27.1 micrometers and minor lenses on the surface of the major lenses with an average diameter of 6.7 micrometers. The average minor to major lens ratio was 17.2 to 1. The structure of the cast coated diffusion sheets is as follows,
Formed polyolefin lenses
Transparent polyester base The projection media was them post-manufacture printed adding color and changing the diffusivity selectively. The film was printed using a thermal printing with thermal dye sublimation, Kodak model 8670 PS Thermal Printer. The thermal print head applied heat and pressure to melt the lenses when they cool back below the glass transition temperature; they harden in the new flat state. The heat and pressure melted the lenses causing an almost completely specular transmission area in the film and at the same time, colored the specular areas. One printed feature was specular text in size fonts from size 6 to size 30 in the Time New Roman Font that was colored red. Another feature was a group of filled in 0.5 cm specular squares that were colored yellow. The third feature printed was a specular grid structure that was colored green. Though these features were chosen, any feature (such as text, lines, or graphics) could have been used and colored or left clear.

The printed projection media from above were measured for % light transmission and % diffuse light transmission, diffuse light transmission efficiency, a*, and b*. "a*" is a measure of the redness or greenness and is expressed as single number, which is positive if the color is red and negative if the color is green. Similarly, yellowness or blueness is expressed by "b*", which is positive for yellow and negative for blue. The larger the absolute value is for the a* and b*, the more colored the film is. The a* and b* values of the films were measured using a CIElab colorimeter with an 1964 observer and a D65 illuminate.

The diffuse areas of the printed projection media were measured with the Hitachi U4001 UV/Vis/NIR spectrophotometer equipped with an integrating sphere. The total transmittance spectra were measured by placing the samples at the beam port with the front surface with complex lenses towards the integrating sphere. A calibrated 99% diffusely reflecting standard (NIST-traceable) was placed at the normal sample port. The diffuse transmittance spectra were measured in like manner, but with the 99% tile removed. All spectra were acquired between 350 and 800 nm. As the diffuse reflectance results are quoted with respect to the 99% tile, the values are not absolute, but would need to be corrected by the calibration report of the 99% tile.

Percentage total transmitted light refers to percent of light that is transmitted though the sample at all angles. Diffuse transmittance is defined as the percent of light passing though the sample excluding a 2.5 degree angle from the incident light angle. The diffuse light transmission is the percent of light that is passed through the sample by diffuse transmittance. The term "diffusion efficiency" and "haze" means the ratio of % diffuse transmitted light at 500 nm to % total transmitted light at 500 nm multiplied by a factor of 100, as known as haze in the art. Diffuse reflectance is defined as the percent of light reflected by the sample. The percentages quoted in the examples were measured at 500 nm. These values may not add up to 100% due to absorbencies of the sample or slight variations in the sample measured.

The measured values for the invention are listed in Table 1 below.

TABLE 1

| Projection Media (After Printing) | Diffuse Areas | Specular Red Text | Specular Yellow Squares | Specular Green Grid |
|---|---|---|---|---|
| Total transmission at 500 nm | 85.2% | 87.5% | 90.2% | 88.7% |
| Diffuse transmission efficiency at 500 nm | 85.7% | 13.1% | 12.7% | 13.0% |
| a* | 0.7 | 50.1 | 0.2 | −38.3 |
| b* | 1.0 | 2.4 | 42.9 | 4.1 |

As the data above clearly indicates, the projection media with complex polymer lenses as the light diffusing elements formed on the surface of a transparent polymer provided vivid colors as well as large differences in the diffusion efficiencies of the printed and non-printed areas. When projected, the high diffusion efficiency of the non-printed areas (85.7%) translated into a dark gray projected area. The colored areas (text, squares, and a grid) displayed as bright colored areas when projected because of their a*, b* values and their low diffusion efficiency values (12.7–13.1%). When the printed projection media was projected using a standard overhead projection system the image projected was high in contrast and easily viewed and read with the surrounding room lighting on.

The projection media of the present invention can display text, shapes, and images in varying amounts of diffusion or specular areas and different colors surrounded by diffuse regions to create visually interesting and easily readable overheads. The projection media improved the contrast in the projected sheet allowing the display to be more easily read in a bright room and produced an unusual display effect.

While this example was primarily directed toward the use of overhead projection media, the materials of the invention have value in other diffusion applications such as back light display, imaging elements containing a diffusion layer, a diffuser for specular home lighting and privacy screens, imaging media, and greenhouse light diffusion.

| Parts List | |
|---|---|
| 1 | Cross section of one embodiment of the projection media before printing |
| 2 | Transparent layer |
| 4 | Complex lenses |
| 6 | Average peak to valley height |
| 10 | Cross section of one embodiment of the projection media after printing |
| 12 | Transparent layer |
| 14 | Complex lenses |
| 16 | Flattened complex lens area |
| 20 | Cross section of another embodiment of the projection media before printing |
| 22 | Transparent layer |
| 24 | Lenses |
| 30 | Cross section of another embodiment of the projection media before printing |
| 32 | Pressure sensitive adhesive |
| 34 | Transparent layer |
| 36 | Dye receiving layer |

| -continued | |
|---|---|
| Parts List | |
| 40 | Apparatus to apply heat and/or pressure selectively to create areas of specular transmission |
| 42 | Transparent layer |
| 44 | Complex lenses |
| 46 | Print head |
| 48 | Area where print head is applying heat and/or pressure |
| 50 | Cross section of projection media with color added to the area of specular transmission |
| 52 | Transparent layer |
| 54 | Complex lenses |
| 56 | Area of specular transmission |
| 58 | Color |
| 60 | Printed projection media |
| 62 | Unprinted area |
| 64 | Text |
| 66 | Shape |
| 68 | Image |
| 70 | Projection system |
| 72 | Light source |
| 74 | Printed projection media |
| 76 | Projection lens unit |
| 78 | Projection screen |
| 80 | Darker projected areas |
| 82 | Bright projected areas |

What is claimed is:

1. A projection media comprising a transparent polymer layer with random light diffusing elements in the form of complex lenses and having a Tg of less than 75° C. and a light transmission of at least 85%.

2. The projection media of claim 1 wherein the diffusing elements have an average peak to valley height of no more than 10 micrometers.

3. The projection media of claim 1 wherein the diffusing elements have an aspect ratio of between 0.1 and 1.0.

4. The projection media of claim 1 wherein the light diffusing elements contain titanium dioxide particles less than 30 nanometers.

5. The projection media of claim 1 wherein the light diffusing elements have a Tg of no more then 55° C.

6. The projection media of claim 1 wherein the polymer layer comprises a dye receiving layer.

7. The projection media of claim 1 wherein the polymer layer comprises an UV curable polymer.

8. The projection media of claim 1 wherein the polymer layer comprises a polyolefin.

9. The projection media of claim 1 wherein the polymer layer comprises a polyester.

10. The projection media of claim 1 wherein the polymer layer comprises a polycarbonate.

11. The projection media of claim 1 wherein the polymer layer further comprises dye or pigment.

12. The projection media of claim 1 wherein the polymer layer contains a colorant.

13. The projection media of claim 1 wherein the projection media comprises a transparent substrate.

14. The projection media of claim 1 wherein the projection media has a haze of at least 70%.

15. The projection media of claim 1 wherein the projection media further comprises a pressure sensitive adhesive.

16. The projection media of claim 1 wherein the projection media, when projected, has a contrast level of at least 300:1.

17. The projection media of claim 1 comprising specular areas of transmission.

18. The projection media of claim 17 wherein the specular areas are colored.

19. The projection media of claim 18 wherein the colored specular areas comprise dye.

20. A process for projecting an image comprising subjecting the media of claim 17 to transmitted light, condensing the light into a projection lens unit, and projecting the light to a projection screen.

21. A process for writing on a projection media of claim 1 comprising applying heat and/or pressure to selectively create areas of specular transmission.

22. The process of claim 21 wherein the heat and/or pressure is applied by a resistive thermal head.

23. The process of claim 21 wherein the process for writing on a projection media comprises adding color to the areas of specular transmission.

24. The process of claim 23 wherein the added color is dye based.

25. The process of claim 21 wherein the areas of specular transmission comprise text, shapes, or images.

* * * * *